United States Patent
McLoughlin et al.

(10) Patent No.: US 9,829,895 B2
(45) Date of Patent: Nov. 28, 2017

(54) SYSTEM AND METHOD OF AUTOMATIC TANK REFILL

(75) Inventors: John E. McLoughlin, Hauppauge, NY (US); Neocles G. Athanasiades, E. Setauket, NY (US); Kiam Meng Toh, St. James, NY (US)

(73) Assignee: ROM Acquisition Corporation, Belton, MO (US)

(*) Notice: Subject to any disclaimer, the term of this patent is extended or adjusted under 35 U.S.C. 154(b) by 786 days.

(21) Appl. No.: 13/284,544

(22) Filed: Oct. 28, 2011

(65) Prior Publication Data

US 2013/0105182 A1  May 2, 2013

(51) Int. Cl.
| | |
|---|---|
| *A62C 27/00* | (2006.01) |
| *G05D 9/12* | (2006.01) |
| *F04B 17/05* | (2006.01) |
| *F04B 17/06* | (2006.01) |

(52) U.S. Cl.
CPC .............. *G05D 9/12* (2013.01); *A62C 27/00* (2013.01); *F04B 17/05* (2013.01); *F04B 17/06* (2013.01); *Y10T 137/0396* (2015.04); *Y10T 137/2534* (2015.04); *Y10T 137/2605* (2015.04)

(58) Field of Classification Search
CPC .................................................... A62C 27/00
USPC ...... 169/13, 24; 239/148, 124, 127, 65, 172, 239/71, 73, 74; 137/101.25, 115.13, 137/115.25; 417/18–20, 26, 28, 34, 36, 417/38, 42, 43, 63, 211.5, 213, 278, 279, 417/282, 300, 364; 141/95, 192, 198; 700/282, 283
See application file for complete search history.

(56) References Cited

U.S. PATENT DOCUMENTS

| | | | |
|---|---|---|---|
| 1,885,093 A | 10/1932 | Fox | |
| 4,039,001 A * | 8/1977 | Weldy | 137/389 |
| 4,183,721 A | 1/1980 | Peterson | |
| 4,189,005 A * | 2/1980 | McLoughlin | 169/24 |
| 4,482,017 A | 11/1984 | Morris | |
| 4,638,924 A * | 1/1987 | Newsom | 222/1 |
| 5,888,051 A | 3/1999 | McLoughlin | |
| 6,196,246 B1 * | 3/2001 | Folsom | 137/2 |
| 6,719,065 B2 * | 4/2004 | Baughman | 169/52 |
| 6,761,226 B2 * | 7/2004 | Carrier | A62C 27/00 169/13 |
| 8,789,614 B2 * | 7/2014 | Hosfield | 169/14 |
| 2001/0042627 A1 * | 11/2001 | Carrier et al. | 169/24 |

(Continued)

*Primary Examiner* — Alexander Valvis
(74) *Attorney, Agent, or Firm* — Wei Wei Jeang; Grable Martin Fulton PLLC

(57) ABSTRACT

A fire truck operable to automatically refill a water tank comprises a first pressure transducer coupled to an intake inlet of the pump and operable to measure an intake pressure, a second pressure transducer coupled to a discharge outlet of the pump and operable to measure a discharge pressure, a first discharge pipe coupled between the discharge outlet of the pump and a fire hose, a second discharge pipe coupled between the discharge outlet of the pump and the water tank, a control valve disposed in the second discharge pipe, and a controller operable to automatically sense a low water level condition of the tank, and automatically control the engine speed, the pump speed, and the control valve so that adequate water supply to the fire hose via the first discharge pipe is automatically given priority and maintained while automatically refilling the water tank via the second discharge pipe.

11 Claims, 2 Drawing Sheets

(56) References Cited

U.S. PATENT DOCUMENTS

| | | | |
|---|---|---|---|
| 2002/0139543 A1* | 10/2002 | Baughman | 169/52 |
| 2009/0208346 A1 | 8/2009 | McLoughlin | |
| 2010/0065286 A1* | 3/2010 | Hosfield | 169/13 |
| 2011/0064591 A1 | 3/2011 | McLoughlin | |

* cited by examiner

SYSTEM AND METHOD OF AUTOMATIC TANK REFILL

FIELD

The present disclosure relates to a system and method of automatic tank refill generally for firefighting applications.

BACKGROUND

Firefighting is a highly dangerous task that subjects firefighters to many hazards. An important asset to the firefighting companies is a steady and abundant water supply, such as supplied by a fire hydrant or drafting. The water is typically conducted to the site of the fire via a fire hose connected to the hydrant's nozzle or a drafting source. In some instances, the water from the fire hydrant is used to refill a water tank while at the same time supplying water to the fire hose used to extinguish the fire. A dangerous situation occurs when the pump operator misjudges the operating parameters and inadvertently diminishes the water supplied to the fire hose in favor of filling the water tank. Such sudden and unexpected reduction in water supplied to the fire hose can be disastrous for the firefighters at the scene.

SUMMARY

A system and method of automatic tank refill generally for firefighting applications is envisioned and described herein.

A fire truck having an engine driving a pump operable to automatically refill a water tank comprises a first pressure transducer coupled to an intake inlet of the pump and operable to measure an intake pressure or vacuum, a second pressure transducer coupled to a discharge outlet of the pump and operable to measure a discharge pressure, a level sensor coupled to the water tank operable to measure a water level, a first pump discharge pipe coupled between the discharge outlet of the pump and a fire hose, a second pump discharge pipe coupled between the discharge outlet of the pump and the water tank, a control valve disposed in the second pump discharge pipe, and a controller operable to automatically sense a low water level condition of the tank, and automatically control the engine speed, the pump speed, and the control valve so that adequate water supply to the fire hose via the first pump discharge pipe is automatically maintained while automatically refilling the water tank via the second pump discharge pipe.

A method for automatically refilling a water tank mounted on a fire truck, comprises automatically determining that the water level in the tank is low, automatically determining that a sufficient volume of water is supplied to a pump, automatically determining that a speed of an engine of the fire truck is less than a predetermined maximum speed, where the engine drives the pump, automatically opening a control valve to permit water from a discharge outlet of the pump to flow to the water tank, automatically increasing the engine speed and a speed of the pump to increase a water volume from the pump discharge outlet so that adequate water volume is supplied to a fire hose while water is supplied to the water tank, automatically determining that the water level in the tank is high, automatically closing the control valve in response to determining the water level in the tank is high, and automatically decreasing the engine speed and the pump speed.

A memory having stored therein computer software code executable by a computer to implement a method for automatically refilling a water tank used for firefighting applications, comprises automatically determining that the water level in the tank is generally below a first predetermined level set point, automatically determining an intake pressure of a pump is generally at a predetermined operating set point pressure or vacuum, automatically determining that a speed of an engine of a fire truck is less than a predetermined maximum speed, where the engine drives the pump, automatically opening a control valve to permit water from a discharge outlet of the pump to flow to the water tank, automatically and gradually increasing the engine speed and a speed of the pump so that adequate water volume is supplied to a fire hose while water is supplied to the water tank, until the water level in the tank is generally above a second predetermined level set point, automatically closing the control valve, and automatically and gradually decreasing the engine speed and the pump speed until the discharge pressure of the pump is generally at a predetermined operating set point.

A system for automatically refilling a water tank mounted on a fire truck having an engine driving a pump, comprises a first pressure sensor coupled to an intake inlet of the pump and operable to sense an intake pressure, a second pressure sensor coupled to a discharge outlet of the pump and operable to sense a discharge pressure, a level sensor coupled to the water tank operable to sense a water level, a first pump discharge pipe coupled between the discharge outlet of the pump and a fire hose, a second pump discharge pipe coupled between the discharge outlet of the pump and the water tank, a control valve disposed in the second pump discharge pipe, and a controller operable to automatically sense a low water level condition of the water tank, and automatically control the engine speed, the pump speed, and the control valve so that adequate water supply to the fire hose via the first pump discharge pipe is maintained while diverting water to fill the water tank via the second pump discharge pipe.

DETAILED DESCRIPTION

Figure 1:
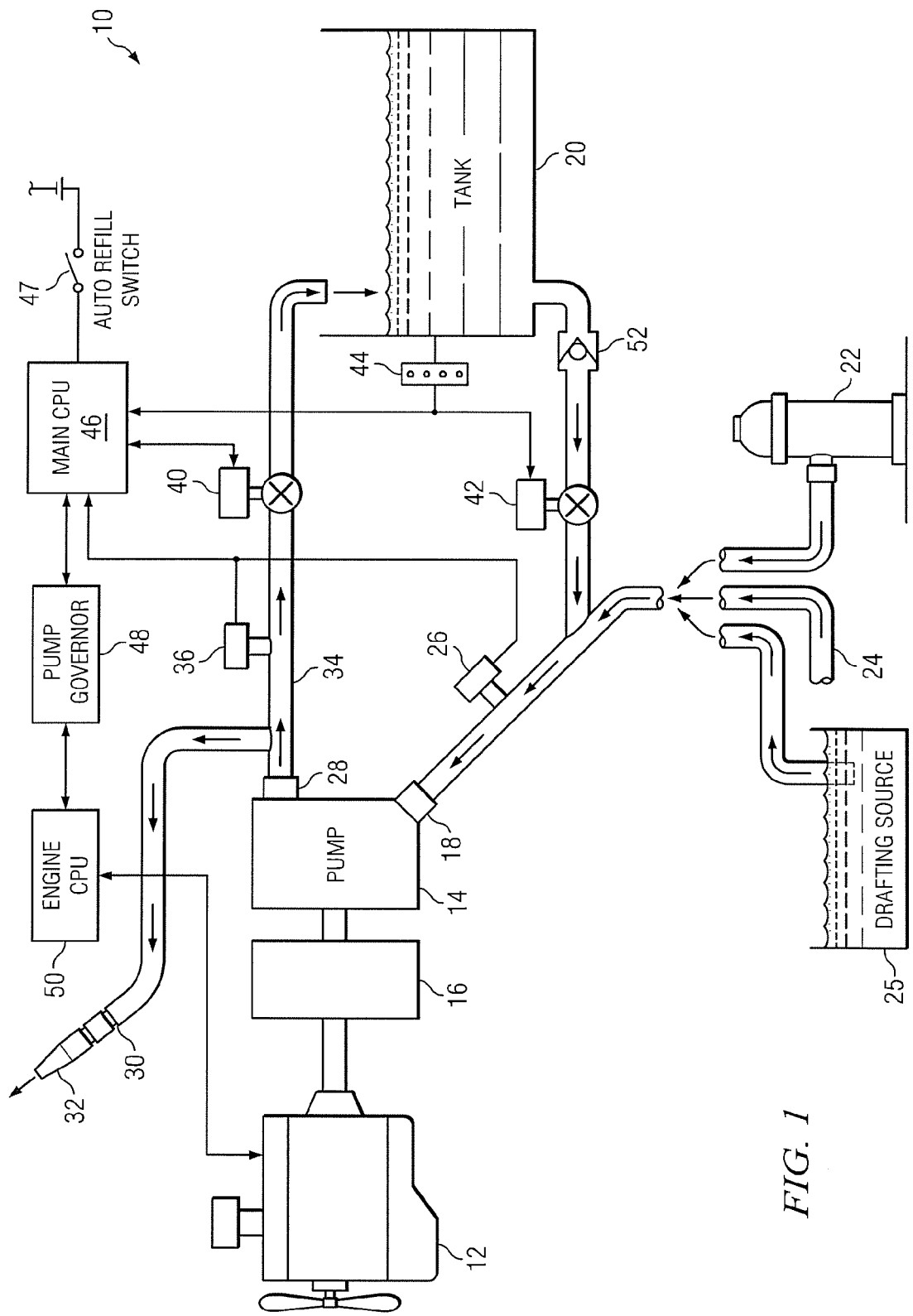
FIG. 1 is a simplified block diagram of an exemplary embodiment of a system of automatic tank refill generally for firefighting applications.

FIG. 1 is a simplified block diagram of an exemplary embodiment of a system 10 of automatic tank refill generally for firefighting applications. System 10 is shown in operation with an engine 12 of a fire truck (not shown) mechanically coupled to a pump 14 via a pump transfer case 16. An intake inlet 18 of the pump 14 may be coupled to a fluid source, such as, without limitation, a tank 20 mounted on the fire truck, a fire hydrant 22, and a relay hose 24. The relay hose 24 may be coupled to another fluid source, such as a tank mounted on a tanker truck (not shown), or for example a drafting source 25 such as a water reservoir, pool, pond, and lake. A pressure transducer or sensor 26 is coupled to the intake inlet 18 of the pump 14 and operable to measure or sense the water pressure at the intake inlet 18 of the pump 14. The pump 14 further includes a discharge outlet 28 that is coupled to a fire hose 30 and a nozzle 32. The discharge outlet 28 is also coupled to a discharge pipe 34 that leads to the tank 20. A pressure transducer or sensor 36 is coupled to the pump discharge outlet 28 and operable to measure or sense the pump discharge pressure. Two control valves 40 and 42 are coupled to the pump's discharge outlet 28 and intake inlet 18, respectively. The control valve 40 may be opened and closed to control water flow from the pump 14 to the tank 20; the control valve 42 may be opened and closed to control water flow from the tank 20 to the pump 14. A liquid level sensor 44 is coupled to the tank 20 to measure or sense the amount of liquid stored in the tank 20. Additionally, a check valve 52 is disposed in the conduit from the tank 20 to the pump 14 to regulate the direction of water flow. The components described above may employ designs and construction now known or later developed.

The transducers and control valves described above are in electrical communication with one or more controllers. In a preferred embodiment, coupled to the pressure transducers 26 and 36 is a main CPU (central processing unit) 46, which is further coupled to a pump governor 48 and an engine CPU 50. The main CPU 46 is operable to receive pressure measurements from the pressure transducers 26 and 36 periodically or upon polling. The main CPU 46 is further coupled to the control valves 40 and 42 to control their open-close states. The level sensor 44 is also operable to provide the tank level measurement to the main CPU 46 periodically or when polled. A manually-operable switch 47 is coupled to the main CPU 46 that enables an operator to issue an instruction to initiate the automatic refill process. Although FIG. 1 shows these electrical connections as wired connections, wireless transmission may be used by the main CPU 46 to send and receive sensed data and control information. The main CPU 46 is operable to send control signals to the pump governor 48, which is further operable to control the pump speed by controlling the engine speed, via the engine CPU 50. The engine CPU 50 is further operable to monitor the engine speed.

It should be understood that although memory devices, interface circuits, analog-to-digital circuits, digital-to-analog circuits, and other devices known in the art are not explicitly shown in FIG. 1 or described herein, such circuits and devices are included in the system 10 where required or appropriate to carry out the method shown in FIG. 2 and described below.

Figure 2:
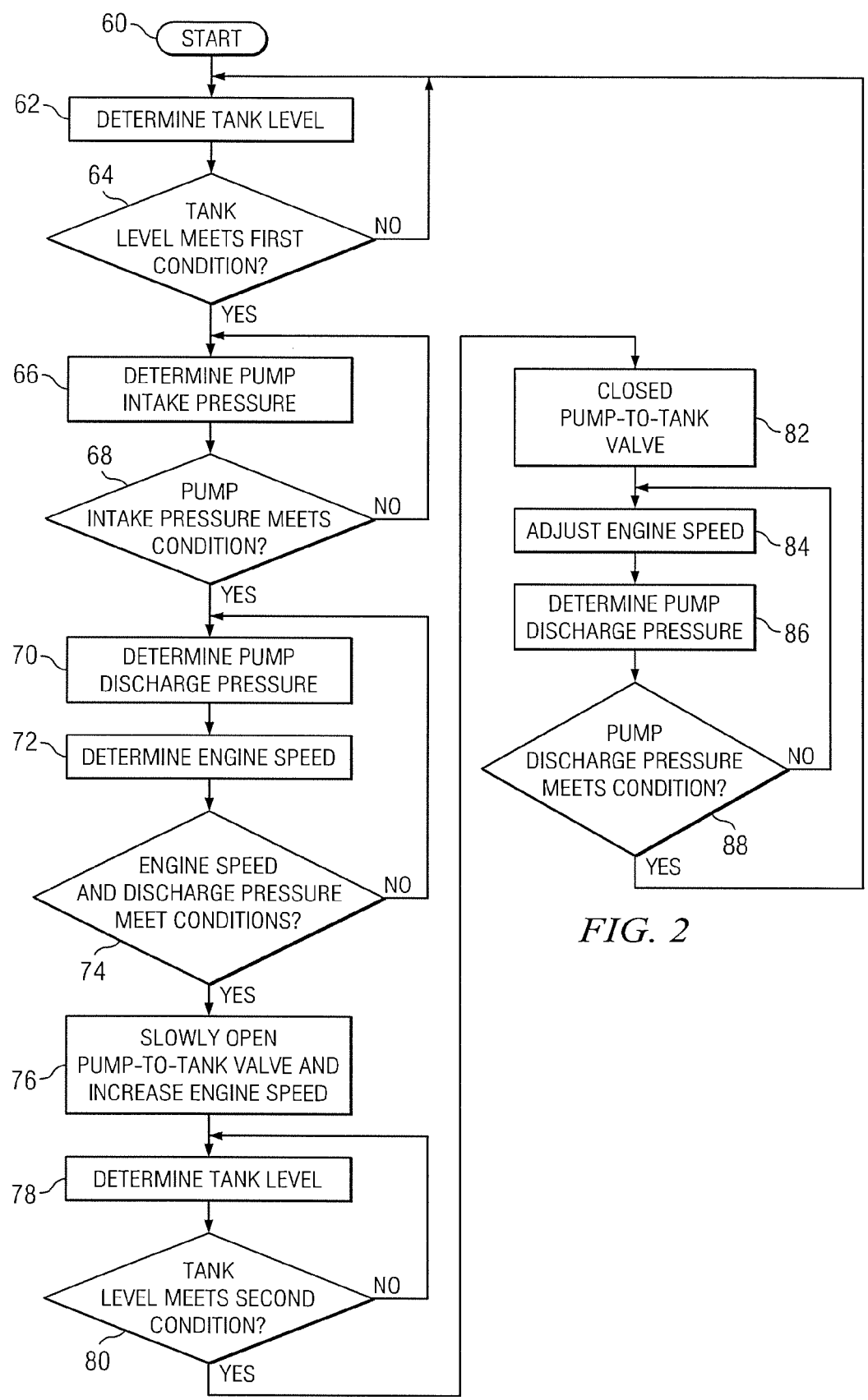
FIG. 2 is a simplified flowchart of an exemplary method of automatic tank refill generally for firefighting applications.

FIG. 2 is a simplified flowchart of an exemplary method 60 of automatic tank refill generally for firefighting applications. The method 60 may be implemented in computer software code specifying logic and operations which are carried out in series of steps. In block 62, the amount or level of water in the tank 20 is measured by level sensor 44 and relayed to the main CPU 46. In block 64, a determination is made as to whether the tank level meets a certain predetermined condition, such as whether the tank is near empty, 80% down, or meeting or drops below a specific low level set point. The method proceeds to block 66 if the tank is low and in need of refilling.

In block 66, the pump intake pressure measurement is obtained from the pressure transducer 26. In block 68, a determination is made as to whether the pump intake pressure meets a certain condition, such as the intake pressure meeting or exceeding a predetermined operating set point indicative of sufficient water supply from the water source or fire hydrant. If the intake pressure meets the criteria, then in block 70 the pump discharge pressure is obtained from the pressure transducer 36. A reading is also made of the engine speed via the engine CPU 50 and made available to the main CPU 46. In block 74, a determination is made as to whether the engine speed meets a certain predetermined condition and that the pump discharge pressure also meets a certain predetermined condition. For example, if the engine speed is not at a maximum value, and the pump discharge pressure is at or above a value indicative of sufficient discharge volume, then in block 76 the pump-to-tank valve 40 at the discharge pipe is slowly opened, under the control of the main CPU 46. In opening the pump-to-tank valve 40, the incoming water volume is partially diverted from the fire hose 30 leading to the firefighting task to fill the water tank 20. In coordination with opening the valve 40, the main CPU 46 controls or instructs the pump governor 48 and engine CPU 50 to increase or ramp up the speed of the engine 12. An increase in engine speed in turn increases the pump speed and the discharge water pressure. In this way, the increase in the engine and pump speeds maintains sufficient water delivery to the fire hose for firefighting as well as satisfies the need to refill the water tank 20. In other words, as long as the incoming water volume is sufficient as determined by the intake pressure, the main CPU 46 ramps up the engine and pump speeds in a coordinated way to meet the higher demands of simultaneously supplying water to the fire hose as well as refilling the tank. Accordingly, the intake water volume is equal to the volume of water supplied to the fire hose plus the volume of water supplied to the water tank, where the volume of water supplied to the fire hose is not greatly diminished and remains sufficient for firefighting.

In block 78, the water level in the tank 20 is monitored and communicated to the main CPU 46, until the tank level meets or exceeds a predetermined high level set point, as determined in block 80, then the main CPU 46 instructs the pump-to-tank valve 40 to be closed in block 82. The main CPU 46 further instructs the pump governor 48 and engine CPU 50 to adjust or decrease the speeds of the engine 12 and the pump 14 accordingly, in block 84, to maintain the pump discharge pressure at a predetermined level, so that the fire hose 30 receives adequate water supply. The pump discharge pressure is monitored in blocks 86 and 88 to determine whether further engine and pump speed adjustments are further necessary. Once the pump discharge pressure is maintained at a predetermined operating level, the method may loop back to block 62 to again ascertain the water level in the tank. If the water level in the tank 20 drops below the low level set point again, the method 60 automatically refills the tank.

In an alternate embodiment, instead of completely closing the pump-to-tank valve 40 in block 82, the main CPU 46 may modulate the valve 40 to continue the water flow into the water tank 20 so that an operating condition in which water from the tank is used continuously to supply the fire hose and the water from the fire hydrant is used to continuously refill the tank.

Accordingly, the disclosed method automatically detects a low tank condition and automatically initiates the sequences to partially divert water from the fire hose to the water tank to refill the tank. In addition, because the control of the engine and pump speeds is automatically coordinated with the filling of the tank, the risk of providing inadequate water supply to firefighting is minimized.

It should be noted that the word "water" is used herein to generally convey the concept of a fluid used for firefighting purposes, and "water" may include water, foam, chemicals, and other types of fluids.

It should be noted that the terminology used above to describe a comparison to a "set point," "predetermined value," "predetermined level," "certain condition," and the like may include a comparison (equal to, less than, and/or greater than) to a specific value or a range of values.

Further notice should be given regarding the actual implementation of the system in that certain changes and modifications to the described system, though not described explicitly or in detail, are contemplated herein. For example, the main CPU and the engine CPU may be implemented using one CPU circuit, controller, or micro-controller circuit. Further, it is understood that a CPU is typically in operation with its attendant circuitry and software, such as memory, interfaces, drivers, etc. as known in the art.

The features of the present invention which are believed to be novel are set forth below with particularity in the appended claims. However, modifications, variations, and changes to the exemplary embodiments described above will be apparent to those skilled in the art, and the system and method of automatic tank refill for firefighting applications described herein thus encompasses such modifications, variations, and changes and are not limited to the specific embodiments described herein.

What is claimed is:

1. A fire truck having an engine driving a pump operable to automatically refill a water tank from a water source, comprising:
    a pump intake line coupled between the water source and an intake inlet of the pump;
    a first pressure transducer coupled to the intake inlet of the pump and operable to measure an intake pressure;
    a second pressure transducer coupled to a discharge outlet of the pump and operable to measure a discharge pressure;
    a level sensor coupled to the water tank operable to measure a water level;
    a first discharge pipe coupled between the discharge outlet of the pump and a fire hose;
    a second discharge pipe coupled between the discharge outlet of the pump and the water tank;
    a control valve disposed in the second discharge pipe; and
    a controller configured to automatically sense a low water level condition of the water tank, and automatically control and coordinate an engine speed, a pump speed, and the control valve so that adequate and steady water supply to the fire hose via the first discharge pipe is automatically maintained by increasing the engine and pump speeds to simultaneously automatically refill the water tank from the water source via the pump intake line, the pump, and the second discharge pipe, wherein the controller is configured to:
        automatically determine whether the water level in the water tank meets a predetermined level condition;
        automatically determine whether the intake pressure sensed in the pump intake inlet meets a first predetermined pressure condition;
        automatically determine whether the discharge pressure sensed in the pump discharge outlet meets a second predetermined pressure condition;
        automatically determine whether engine speed of an engine of the fire truck meets a predetermined speed; and
        in response to the water level, intake pressure, discharge pressure, and engine speed meeting respective predetermined condition, automatically communicate an increase engine speed command to an engine controller and an open command to gradually open the control valve, to refill the water tank while maintaining steady and adequate water supply to the fire hose.

2. A method for automatically refilling a water tank mounted on a fire truck, an engine of the fire truck driving a pump operable to automatically refill a water tank from a water source, comprising:
    a pump intake line coupled between the water source and an intake inlet of the pump;
    a first pressure transducer coupled to the intake inlet of the pump and operable to measure an intake pressure;
    a second pressure transducer coupled to a discharge outlet of the pump and operable to measure a discharge pressure;
    a level sensor coupled to the water tank operable to measure a water level;
    a first discharge pipe coupled between the discharge outlet of the pump and a fire hose;
    a second discharge pipe coupled between the discharge outlet of the pump and the water tank;
    a control valve disposed in the second discharge pipe; and
    a controller configured to perform the steps of:
        automatically determining that the water level in the tank is low;
        automatically determining that a sufficient volume of water is supplied to the pump;
        automatically determining that a speed of the engine of the fire truck is less than a predetermined maximum speed, where the engine drives the pump;
        automatically opening the control valve to permit water from the discharge outlet of the pump to flow to the water tank;
        automatically increasing the engine speed and a speed of the pump to increase a water volume from the pump discharge outlet so that adequate water volume is supplied to a fire hose while water is supplied to the water tank;
        automatically determining that the water level in the tank is high;
        automatically closing the control valve in response to determining the water level in the tank is high; and
        automatically decreasing the engine speed and the pump speed.

3. The method of claim 2, wherein automatically determining that a sufficient volume of water is supplied to the pump comprises automatically determining that the intake pressure of the pump exceeds a predetermined intake pressure set point.

4. The method of claim 2, wherein automatically increasing the engine speed and the speed of the pump further comprises automatically determining the discharge pressure of the pump.

5. The method of claim 2, wherein automatically opening the control valve comprises gradually opening the control valve to gradually increase a water flow.

6. The method of claim 2, wherein automatically decreasing the engine speed and the pump speed further comprises automatically determining the discharge pressure of the pump, and decreasing the engine and pump speeds in response to the discharge pressure being above a predetermined discharge pressure set point.

7. The method of claim 2, further comprising automatically determining the discharge pressure of the pump being a predetermined discharge pressure set point prior to automatically increasing engine speed and automatically opening the control valve.

8. A system for automatically refilling a water tank mounted on a fire truck having an engine driving a pump coupled to a water source, comprising:

a pump intake line coupled between the water source and an intake inlet of the pump;

a first pressure sensor coupled to an intake inlet of the pump and operable to sense an intake pressure;

a second pressure sensor coupled to a discharge outlet of the pump and operable to sense a discharge pressure;

a level sensor coupled to the water tank operable to sense a water level;

a first discharge pipe coupled between the discharge outlet of the pump and a fire hose;

a second discharge pipe coupled between the discharge outlet of the pump and the water tank;

a control valve disposed in the second discharge pipe; and a controller configured to automatically sense a low water level condition of the water tank, and automatically control and coordinate an engine speed, a pump speed, and the control valve so that adequate and steady water supply to the fire hose via the first discharge pipe is automatically maintained while automatically diverting water from the water source to fill the water tank via the pump intake line, the pump, and the second discharge pipe, wherein the controller is further configured to:

automatically determine whether the water level in the water tank meets a predetermined high condition;

in response to the water level meeting the predetermined high condition, automatically close the control valve and automatically communicate a decrease engine speed command to the controller.

9. The system of claim 8, wherein the controller is configured to:

automatically determine whether the water level in the water tank meets a predetermined low condition;

automatically determine whether the intake pressure sensed in the pump intake inlet meets a first predetermined pressure condition;

automatically determine whether the discharge pressure sensed in the pump discharge outlet meets a second predetermined pressure condition;

automatically determine whether engine speed of an engine of the fire truck meets a predetermined speed; and in response to the water level, intake pressure, discharge pressure, and engine speed meeting respective predetermined conditions, automatically communicate an increase engine speed command to an engine controller and an open command to controllably open the control valve, to refill the water tank while maintaining steady and adequate water supply to the fire hose by increasing the engine and pump speeds.

10. The system of claim 8, further comprising an input device configured to receive an operator input to initiate automatic water tank refill operation.

11. A control system on a fire truck having a pump operable to automatically refill a water tank onboard the fire truck, comprising:

a first sensor coupled to an intake inlet of the pump coupled to a water source and operable to measure an intake pressure;

a second sensor coupled to a discharge outlet of the pump and operable to measure a discharge pressure;

a level sensor coupled to the water tank operable to measure a water level of the water tank;

a control valve disposed between the discharge outlet of the pump and the water tank; and a controller configured to automatically and gradually open the control valve and coordinatingly increase an engine speed and a pump speed in response to sensing the intake pressure of the pump meeting a predetermined intake threshold, sensing the discharge pressure of the pump meeting a predetermined discharge threshold, and the water level of the water tank meeting a low threshold, so that adequate and steady water supply to a fire hose coupled to the discharge outlet of the pump is automatically maintained while automatically simultaneously refilling the water tank, wherein the controller is further configured to:

automatically determine whether the water level in the water tank meets a predetermined high threshold; and in response to the water level meeting the predetermine high threshold, automatically close the control valve and automatically decreasing the engine and pump speeds while maintaining adequate and steady water supply to the fire hose.

* * * * *